United States Patent
Ouchi et al.

(10) Patent No.: US 7,058,171 B2
(45) Date of Patent: Jun. 6, 2006

(54) IP TELEPHONE APPARATUS AND IP TELEPHONE SYSTEM

(75) Inventors: Tetsuya Ouchi, Aichi (JP); Susumu Chida, Aichi (JP); Tokunori Kato, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/634,885

(22) Filed: Aug. 6, 2003

(65) Prior Publication Data

US 2004/0028220 A1 Feb. 12, 2004

(30) Foreign Application Priority Data

Aug. 6, 2002 (JP) ............................. 2002-228706
Sep. 30, 2002 (JP) ............................. 2002-285187
Apr. 17, 2003 (JP) ............................. 2003-112336

(51) Int. Cl.
*H04M 1/72* (2006.01)

(52) U.S. Cl. .......................... 379/355.02; 379/387.01; 370/352

(58) Field of Classification Search ................ 370/352; 455/553.1, 554.2; 379/387.01
See application file for complete search history.

(56) References Cited

U.S. PATENT DOCUMENTS

| | | | |
|---|---|---|---|
| 5,715,296 A | * | 2/1998 | Schornack et al. ......... 455/403 |
| 6,141,341 A | | 10/2000 | Jones et al. |
| 6,480,581 B1 | * | 11/2002 | Wu et al. ................ 379/93.01 |
| 6,741,835 B1 | * | 5/2004 | Pulver ....................... 455/3.05 |
| 2003/0026244 A1 | * | 2/2003 | Pietrowicz et al. ......... 370/352 |

FOREIGN PATENT DOCUMENTS

| | | |
|---|---|---|
| JP | A 10-155034 | 6/1998 |
| JP | A-11-220549 | 8/1999 |
| WO | WO 01/58115 A2 | 8/2001 |
| WO | WO 01/65786 A1 | 9/2001 |
| WO | WO 01/65809 A1 | 9/2001 |
| WO | WO 02/3777 A1 | 5/2002 |

* cited by examiner

*Primary Examiner*—Sinh Tran
*Assistant Examiner*—Walter F Briney, III
(74) *Attorney, Agent, or Firm*—Oliff & Berridge, PLC

(57) ABSTRACT

An IP telephone apparatus for executing a telephone call through a computer network. The IP telephone apparatus includes: a main unit; a telephone line connection unit connected to a telephone network; an external telephone connection unit connectable to an external telephone; a dialing start command detection unit configured to detect an IP telephone dialing start command; an audio signal input/output unit that inputs/outputs an audio signal; a handset validation unit configured to selectively validate one of a handset of the main unit and a handset of the external telephone; an audio signal path switching unit that switches a connection target of the validated handset from the telephone line connection unit to the audio signal input/output unit when the IP telephone dialing start command is detected so that the audio signal input/output unit can be transmitted to the network terminal through the computer network.

27 Claims, 7 Drawing Sheets

FIG. 3

| MAIN UNIT HANDSET | SWITCH MODE |
|---|---|
| SLAVE 1 | SWITCH MODE |
| SLAVE 2 | IP TELEPHONE FIXED MODE |
| SLAVE 3 | GENERAL TELEPHONE FIXED MODE |
| ⋮ | |
| EXTERNAL CONNECTED TELEPHONE | SWITCH MODE |

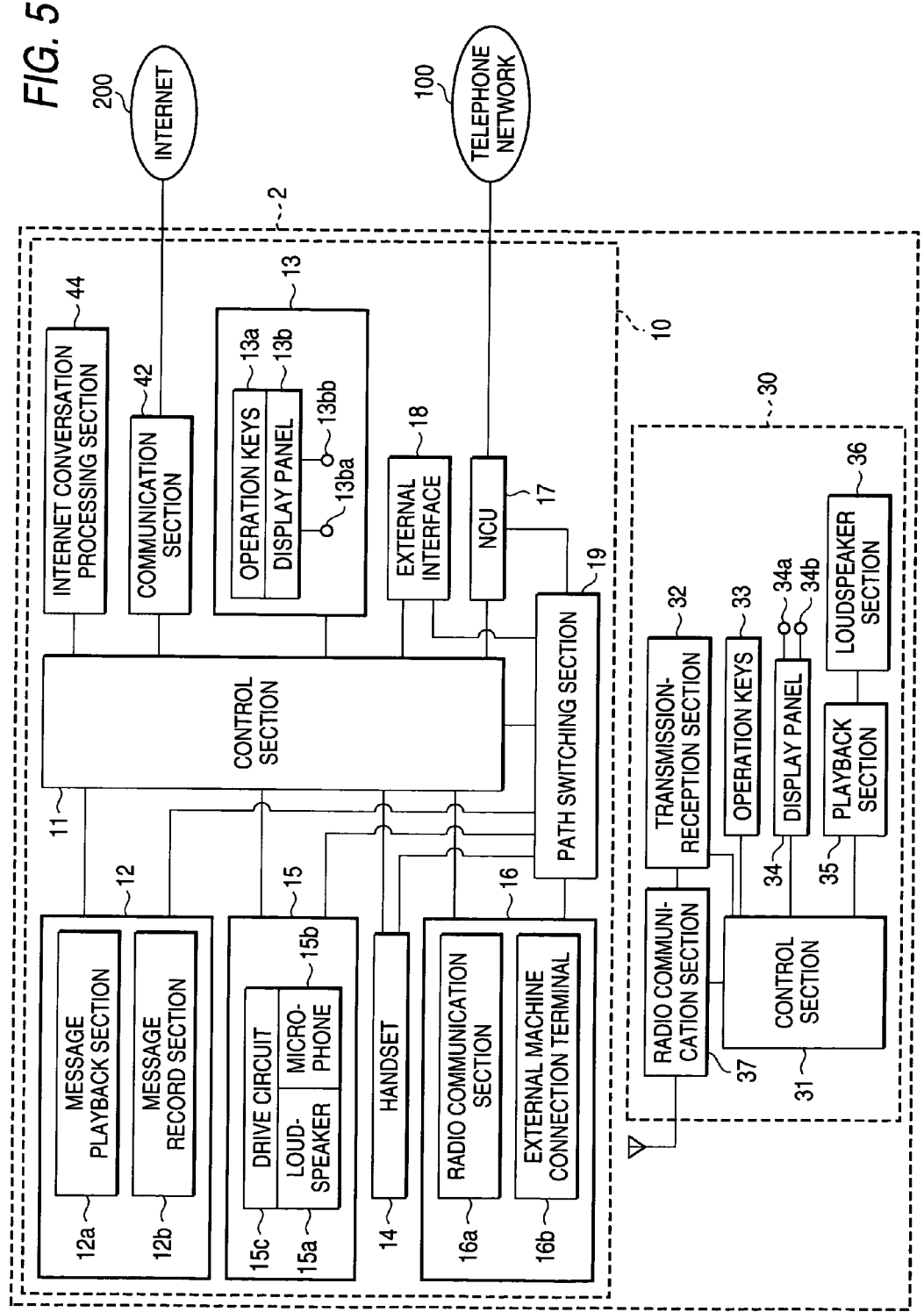

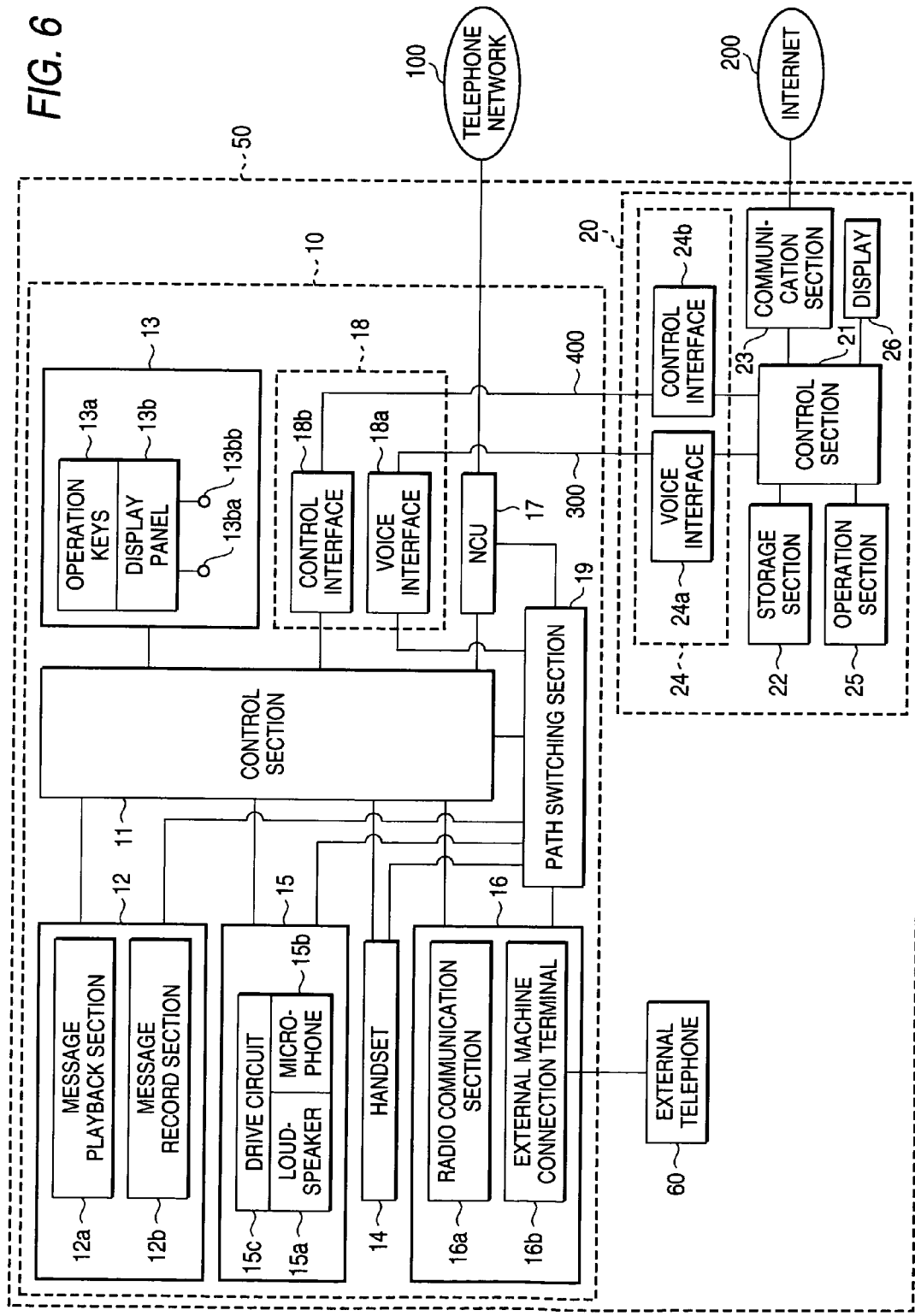

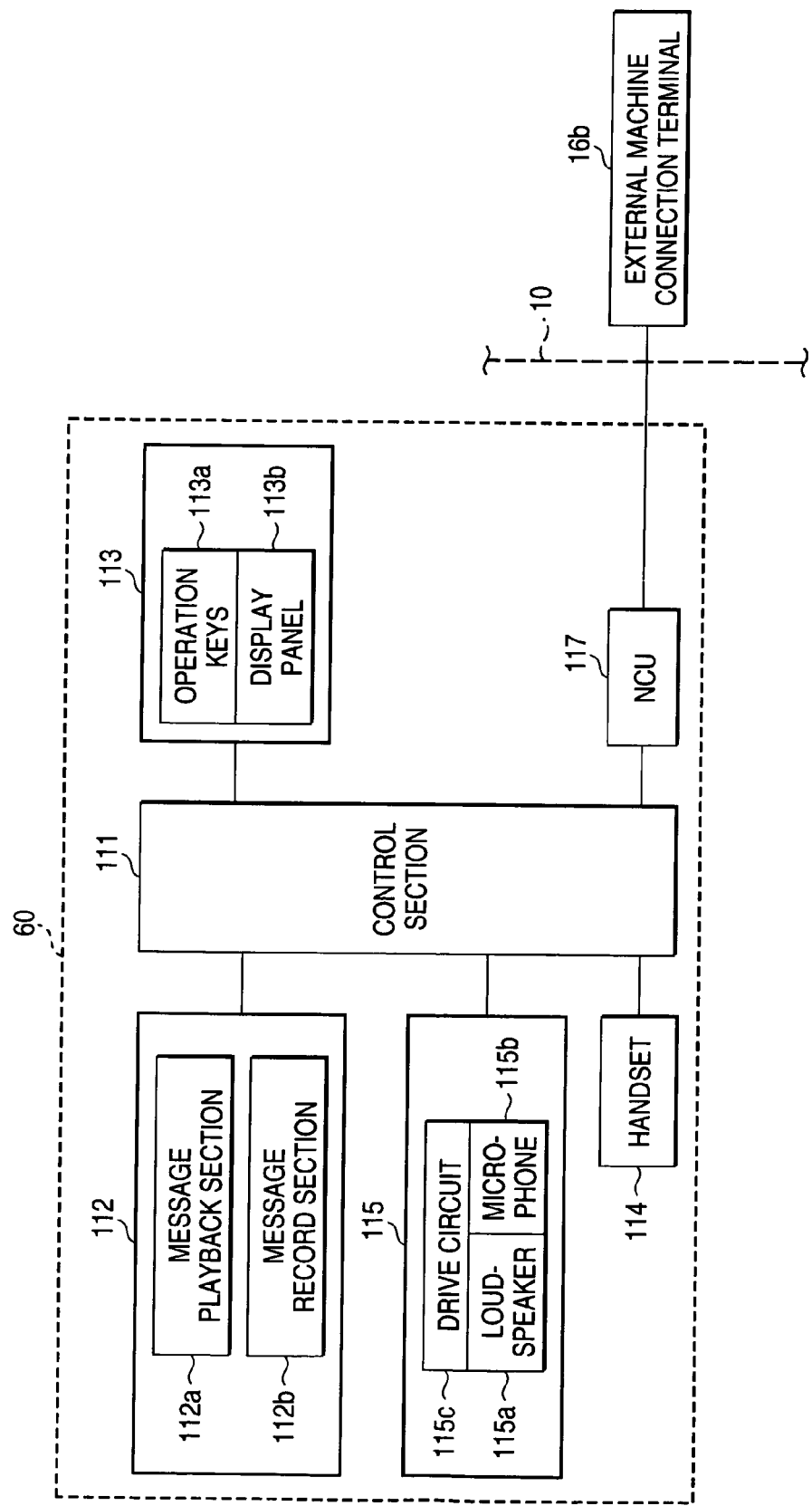

IP TELEPHONE APPARATUS AND IP TELEPHONE SYSTEM

BACKGROUND OF THE INVENTION

1. Field of the Invention

This invention relates to an IP telephone apparatus and an IP telephone system including an Internet telephone function in addition to a general telephone function provided through a public switched telephone network.

2. Background Art

The Internet telephone means a telephone conversation mode in which a packet carrying a voice is transferred in a two-way manner via the Internet. A related art to the Internet telephone for enabling a user to use both the Internet telephone and general telephone (ordinary telephone) functions (for example, refer to JP-A-10-155034) and the like are known.

In the related art, the user can use both the Internet telephone and general telephone functions from the telephone main unit, but cannot use the Internet telephone function from an external telephone including only the general telephone function. Particularly, the user who owns an apparatus for enabling the user to use the Internet telephone function and a telephone including only the general telephone function may want to also use the Internet telephone function at low communication costs from the telephone including only the general telephone function.

SUMMARY OF THE INVENTION

It is therefore an object of the invention to provide an IP telephone apparatus and an IP telephone system for enabling the user to conduct Internet telephone conversation even with an external telephone having only a general telephone function.

To achieve the above object, the invention provide an IP telephone apparatus, for executing a telephone call through a computer network, including: a main unit having a handset; a telephone line connection unit that connects to a telephone network; an external telephone connection unit being connectable to an external telephone having a handset; a dialing start command detection unit configured to detect an IP telephone dialing start command; an audio signal input/output unit that inputs/outputs an audio signal for conversation when the dialing start command unit detects an IP telephone dialing start command; a handset validation unit configured to selectively validate one of the handset of the main unit and the handset of the external telephone; an audio signal path switching unit that switches a connection target of the handset validated by the handset validation unit from the telephone line connection unit to the audio signal input/output unit when the dialing start command detection unit detects the IP telephone dialing start command; and a network communication control unit configured to enable the audio signal input/output unit to transmit and receive the audio signal to and from the network terminal when the dialing start command detection unit detects the IP telephone dialing start command.

According to the IP telephone apparatus, the user can conduct Internet telephone conversation using the IP telephone apparatus alone and in addition, for example, if an external telephone such as a cordless telephone or an external installed telephone having only the general telephone function is connected, the user can conduct Internet telephone conversation using the external telephone.

The invention may provide an IP telephone system, including: a computer connected to a network terminal via a computer network; a handset that receives and generates an audio signal for a telephone conversation; a telephone line connection unit connectable to a telephone network; a computer connection unit connectable to the computer; an audio signal path switching unit that switches a path of the audio signal to one of the telephone line connection unit and the computer connection unit; an external telephone connection unit connected to an external telephone having a general telephone function for telecommunicating through a telephone network: and an IP telephone relay unit configured to receive a predetermined command from the external telephone through the external telephone connection unit and to make the audio signal path switching unit switch the path to the computer connection unit upon reception of a predetermined command, so that the external telephone can telecommunicate with the network terminal.

The invention may provide an IP telephone apparatus, for executing a telephone call through a computer network, including: a main unit having a handset; a telephone line connection unit that connects to a telephone network; an external telephone connection unit being connectable to an external telephone for executing a telephone call through a telephone network, the external telephone having a handset; a dialing start command detection unit configured to detect an IP telephone dialing start command; an audio signal input/output unit that inputs/outputs an audio signal for conversation when the dialing start command unit detects an IP telephone dialing start command; a handset validation unit configured to selectively validates one of the handset of the main unit and the handset of the external telephone; an audio signal path switching unit that switches a connection target of the handset validated by the handset validation unit from the telephone line connection unit to the audio signal input/output unit when the dialing start command detection unit detects the IP telephone dialing start command; and a network communication control unit configured to enable the audio signal input/output unit to transmit and receive the audio signal to and from the network terminal when the dialing start command detection unit detects the IP telephone dialing start command.

The invention may provide an IP telephone apparatus, including: a main unit having a handset; an external telephone connection unit being connectable to an external telephone having a handset; a telephone line connection unit being connectable to a telephone network; a network connection unit being connectable to a computer network; an IP command generating unit configured to generate an IP telephone command for executing an IP telephone call; a handset validation unit configured to selectively validate one of the handset of the main unit and the handset of the external telephone; an audio signal path switching unit that switches a connection target of the handset validated by the handset validation unit from the telephone line connection unit to the network connection unit upon detection of the IP telephone command.

BRIEF DESCRIPTION OF THE DRAWINGS

The present invention may be more readily described with reference to the accompanying drawings, in which:

FIG. 3 is a schematic representation showing setup modes for each machine;

FIG. 5 is a block diagram showing a modification of an IP telephone system;

FIG. 6 is a block diagram showing another modification of an IP telephone system; and FIG. 7 is a block diagram of an external telephone in the IP telephone system shown in FIG. 6.

DETAILED DESCRIPTION OF THE PREFERRED EMBODIMENTS

Referring now to the accompanying drawings, there is shown a preferred embodiment of the invention.

Figure 1:
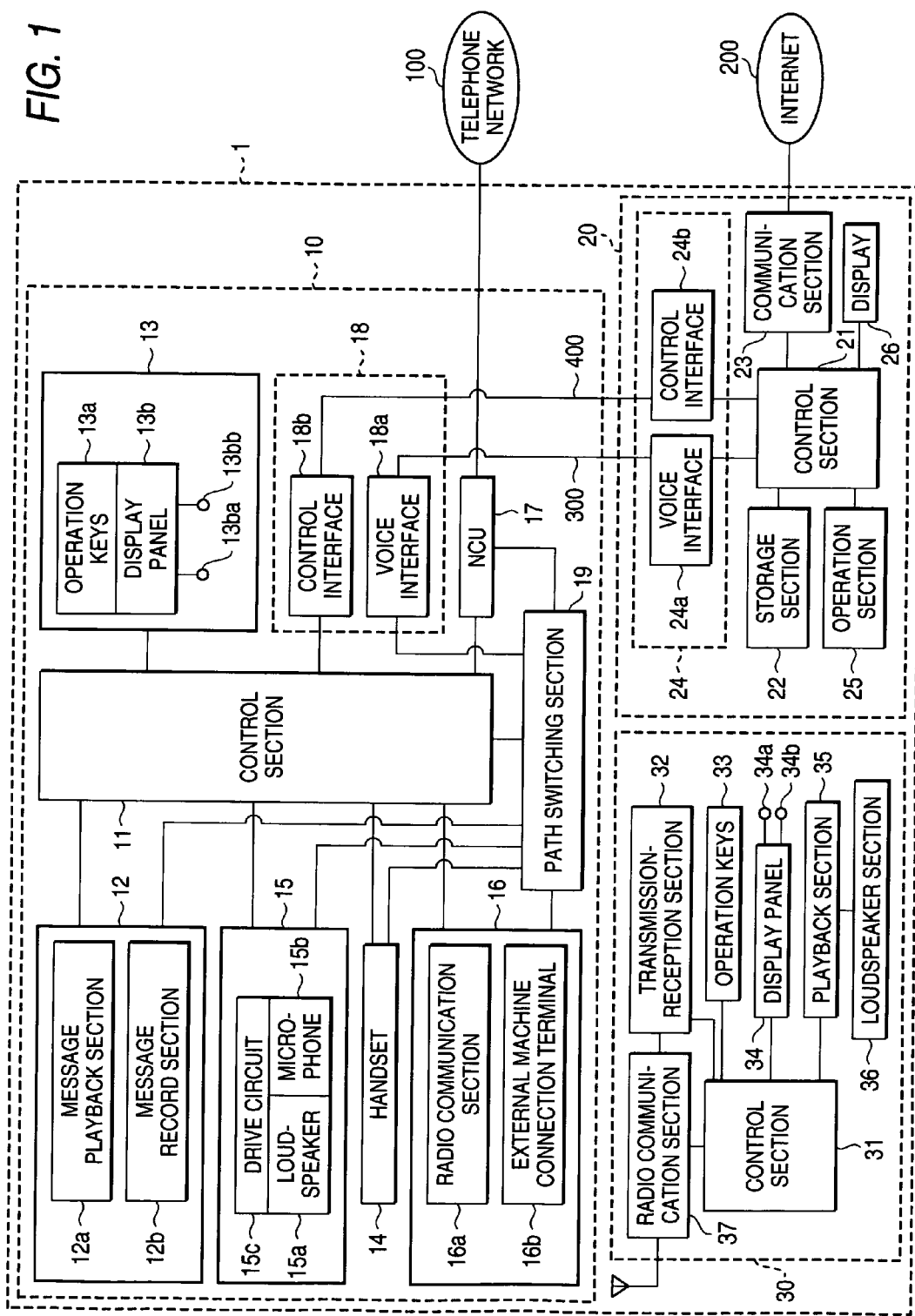
FIG. 1 is a block diagram showing an IP telephone apparatus according to the invention.

FIG. 1 is a block diagram showing an IP telephone system according to the embodiment.

As shown in FIG. 1, an IP telephone system 1 includes an IP telephone apparatus 10 having a function for conducting voice conversation based on an audio signal transmitted via a telephone network 100 and a personal computer (PC) 20 capable of conducting data communications via the Internet 200, the IP telephone apparatus 10 and the PC 20 being connected by an audio cable 300 capable of transmitting an audio signal and a USB (universal serial bus) cable 400 capable of transmitting a control signal.

The IP telephone apparatus 10 includes a control section 11 for controlling the whole operation of the apparatus, a record and playback section 12 for playing back a voice based on an audio signal and recording an audio signal, a user interface section (user I/F) 13, a handset 14 used in a state in which the handset is removed from the IP telephone apparatus 10 main unit, a voice input/output section 15 for inputting/outputting a voice, an external telephone connection section 16 for connecting an external telephone, an NCU (network control unit) 17 for inputting/outputting an audio signal transmitted via the telephone network 100, an external interface section 18 including an audio signal interface section (voice I/F) 18a for inputting/outputting an audio signal transmitted over the audio cable 300 and a control signal interface section (control I/F) 18b for inputting/outputting a control signal transmitted over the USB cable 400, a path switching section 19 for switching an audio signal transmission path in the IP telephone apparatus 10, a slave terminal 30 for conducting radio communications with the IP telephone apparatus 10 main unit (external telephone connection section 16), and the like.

The record and playback section 12 includes a message playback section 12a for playing back voice (sound) based on various audio signals previously recorded and a message record section 12b for recording a message recorded in an automatic answering mode as an audio signal. Recorded in the message playback section 12a are audio signals such as a ring tone used upon reception of an incoming call, a holding tone used when voice conversation is held, and a telephone answering mode message telling that recording a message is started by an automatic answering mode function.

The user I/F 13 includes a plurality of operation keys 13a consisting of keys and a display panel 13b for displaying various pieces of information. The operation keys 13a include a plurality of numeric keys, a hold key for starting and terminating holding of voice conversation, a switch key for switching the transmission path used to input/output an audio signal from/to the outside from the NCU 17 to the voice I/F 18a, an outside line key for starting voice conversation, an off key for terminating voice conversation, and the like.

The voice input/output section 15 includes a loudspeaker 15a, a microphone 15b, and a drive circuit 15c for driving the loudspeaker 15a and the microphone 15b, and can be used not only to output voice (sound) based on various audio signals from the loudspeaker 15a, but also to conduct voice conversation (hand-free conversation) with the loudspeaker 15a and the microphone 15b as a handset.

The external telephone connection section 16 includes a radio communication section 16a for transmitting and receiving various signals containing an audio signal by radio communications with the slave terminal 30. The radio communications are realized through the radio communications. The external telephone connection section 16 further includes an external machine connection terminal 16b for connecting a mobile telephone (not shown), a different telephone apparatus (not shown), etc., by a cable. Wire communications are realized through the external machine connection terminal 16b with a mobile telephone, a different telephone apparatus, etc. The path switching section 19 switches the transmission path used to input/output an audio signal from/to the outside of the IP telephone apparatus 10 to either the NCU 17 or the voice I/F 18a in response to a command received from the control section 11. The transmission path is switched to the NCU 17 in the initial state.

If the user performs operation to start conversation (off-hook operation) with a component functioning as handset (any of the handset 14, the voice input/output section 15, or the slave terminal 30 (external telephone connection section 16), which will be hereinafter referred to as handset component), the path switching section 19 sets the transmission destination of an external input audio signal and the transmission source of an audio signal output to the outside to any handset component. Specifically, if the user removes the handset 14 from the IP telephone apparatus 10 main unit, the audio signal transmission destination and source are set to the handset 14; if the user presses the outside line key of the operation key 13a of the user I/F 13, the audio signal transmission destination and source are set to the voice input/output section 15; if the user performs operation to start conversation with the slave terminal 30 (presses an outside line key forming a part of operation keys 33 described later), the audio signal transmission destination and source are set to the external telephone connection section 16. On the other hand, if the user performs operation to terminate conversation (on-hook operation) with any handset component, the audio signal transmission destination and source set to any handset component are canceled. Specifically, when the user restores the handset 14 to the IP telephone apparatus 10 main unit, presses the off key of the operation key 13a of the user I/F 13, or performs operation to terminate conversation with the slave terminal 30, the audio signal transmission destination and source are canceled.

The slave terminal 30 includes a control sectional for controlling the whole operation of the slave terminal 30, a transmission-reception section 32 including a loudspeaker, a microphone, and a drive circuit for driving the loudspeaker and the microphone, a plurality of operation keys 33, a display panel 34 for displaying various pieces of information, a playback section 35 for playing back voice (sound) based on various audio signals previously recorded, a loudspeaker section 36 including a loudspeaker and a drive circuit for driving the loudspeaker for outputting voice (sound) played back by the playback section 35, a radio communication section 37 for transmitting and receiving various signals containing audio signals as radio signals to and from the radio communication section 16a of the IP telephone apparatus 10 main unit, and the like. The operation keys 33 of the slave terminal 30 include a plurality of numeric keys, an outside line key for starting voice conversation, an off key for terminating voice conversation, a hold key for starting and terminating holding of voice conversation, and the like. Audio signals such as a ring tone used upon reception of an incoming call and a holding tone used when voice conversation is held are recorded in the playback section 35.

The PC 20 includes a control section 21 for controlling the whole operation of the PC 20, a storage section 22 for storing various pieces of information a communication section 23 for connecting the PC 20 to the Internet 200, an external interface section 24 including an audio signal interface section (voice I/F) 24a for inputting/outputting an audio signal over the audio cable 300 and a control signal interface section (control I/F) 24b for inputting/outputting a control signal over the USB cable 400, an operation section 25 including a keyboard, a mouse, etc., a display 26, and the like.

The PC 20 has a function of realizing voice conversation based on an audio signal transmitted via the Internet 200, which will be hereinafter referred to as Internet conversation function. The Internet conversation function is a function realized as the following conversation start processing, transmission and reception processing, and conversation termination processing are executed in accordance with procedures indicated by application software stored in the storage section 22 (conversation software):

First, the conversation start processing is processing for establishing connection (logical communication channel connection) with a PC in which the same conversation software is built among PCs that can conduct data communications through the Internet 200, thereby starting data communications with the PC. The conversation start processing is started when the associated PC is specified through the operation section 25 with the conversation software started. The conversation software continues to output a notification signal of a control signal for notifying that voice conversation is started, through the control I/F 24b and the USB cable 400 to the IP telephone apparatus 10, until the conversation termination processing is performed and the voice conversation using the Internet communication function is terminated after the conversation start processing is performed and the voice conversation using the Internet communication function is started.

In the transmission and reception processing, data is generated in packet units based on an audio signal, transmitted via the communication section 23 and the Internet 200 to the PC with which connection is being established. An audio signal 25 is also generated on the basis of data in packet units transmitted via the Internet 200 and the communication section 23 from the PC with which connection is being established. In the embodiment, data in packet units is generated based on an audio signal input from the IP telephone apparatus 10 via the audio cable 300 and the voice I/F 24a and is output to the Internet 200. The audio signal generated based on the data in packet units is output to the IP telephone apparatus 10 via the voice I/F 24a and the audio cable 300. The transmission and reception processing is executed repeatedly until the conversation termination processing is executed after the conversation start processing is executed, whereby voice conversation is realized between the IP telephone apparatus 10 connected to the PC 20 and the PC connected through the Internet 200.

The conversation termination processing is processing of releasing the connection with the PC with which the connection is being established (logical communication channel disconnection from the PC), thereby terminating the use of the Internet conversation function. The conversation termination processing is started when another PC is specified as an associated conversation party or the conversation software is quitted through the operation section 25. When the conversation software is quitted through the operation section 25, the conversation software transmits a release signal for notifying that the connection is released from the PC in which the conversation software is built to the PC with which the connection is being established. Upon reception of the release signal, the PC 20 also executes the conversation termination processing.

Although not described in detail, a partial section of the communication channel from the communication section 23 of the PC 20 to the Internet 200 (section from user to telephone station) is also used as a telephone line for connecting the section from the NCU 17 of the IP telephone apparatus 10 to the telephone network 100. In the section, according to ADSL (asymmetric digital subscriber line) technology, an audio signal transmitted through the telephone network 100 and data transmitted through the Internet 200 are transmitted in a superposition manner.

The NCU 17 implements a telephone line connection unit for connecting to the telephone network. The external telephone connection section 16 implements an external telephone connection unit for connecting an external telephone having a handset. The control section 11 of the IP telephone apparatus 10 implements an IP dialing start command detection means for detecting an IP telephone dialing start command, a handset validation unit for selectively validating either of the handset of the apparatus main unit and the handset of an external telephone, and a network communication control unit for transmitting and receiving an audio signal to and from any other network terminal when an IP telephone dialing start command is detected. The voice I/F 18a of the IP telephone apparatus 10 implements an audio signal input/output unit for inputting/outputting an audio signal for conversation from/to any other network terminal when the IP telephone dialing start command detection unit detects an IP telephone dialing conversation start command. The path switching section 19 of the IP telephone apparatus 10 implements an audio signal path switching unit that switches a connection target of the handset validated by the handset validation unit from the telephone line connection unit to the audio signal input/output unit.

The control I/F 18b of the IP telephone apparatus 10 implements a control signal input/output unit being connected to computer to input/output various control signals containing an IF telephone dialing start command. The control section 11 of the IP telephone apparatus 10 implements a message transmission unit, upon reception of an off-hook signal from an external telephone, for sending to the external telephone a guidance message to selectively use either of the general telephone and IP telephone functions for transferring an audio signal via the telephone line connection unit. The control section 11 also implements a mode setting unit for setting a switch mode for enabling the user to selectively switch between the general telephone and IP telephone functions for use or a fixed mode for enabling the user to use only either telephone function.

Further, the external interface section 18 of the IP telephone apparatus 10 implements a computer connection unit for inputting/outputting signals containing an audio signal transferred to and from any other terminal on the Internet from/to computer connected to the Internet. The control section 11 of the IP telephone apparatus 10 implements an Internet telephone relay unit, upon reception of a predetermined command from an external telephone through the external telephone connection unit, for switching the audio signal path switching unit into a state in which transfer of an audio signal using the IP telephone function can be executed between any other terminal on the Internet and the external telephone. The control section 11 implements a mode setting unit for setting an all calling mode for sending a ringing signal to the external telephone in response to a connection request received from each of a calling party on the telephone network and any other terminal on the Internet or a one calling mode for sending a ringing signal to the external telephone only when a connection request is received from either a calling party on the telephone network or any other terminal on the Internet.

Next, the main operation will be discussed with reference to the accompanying drawings.

Figure 2:
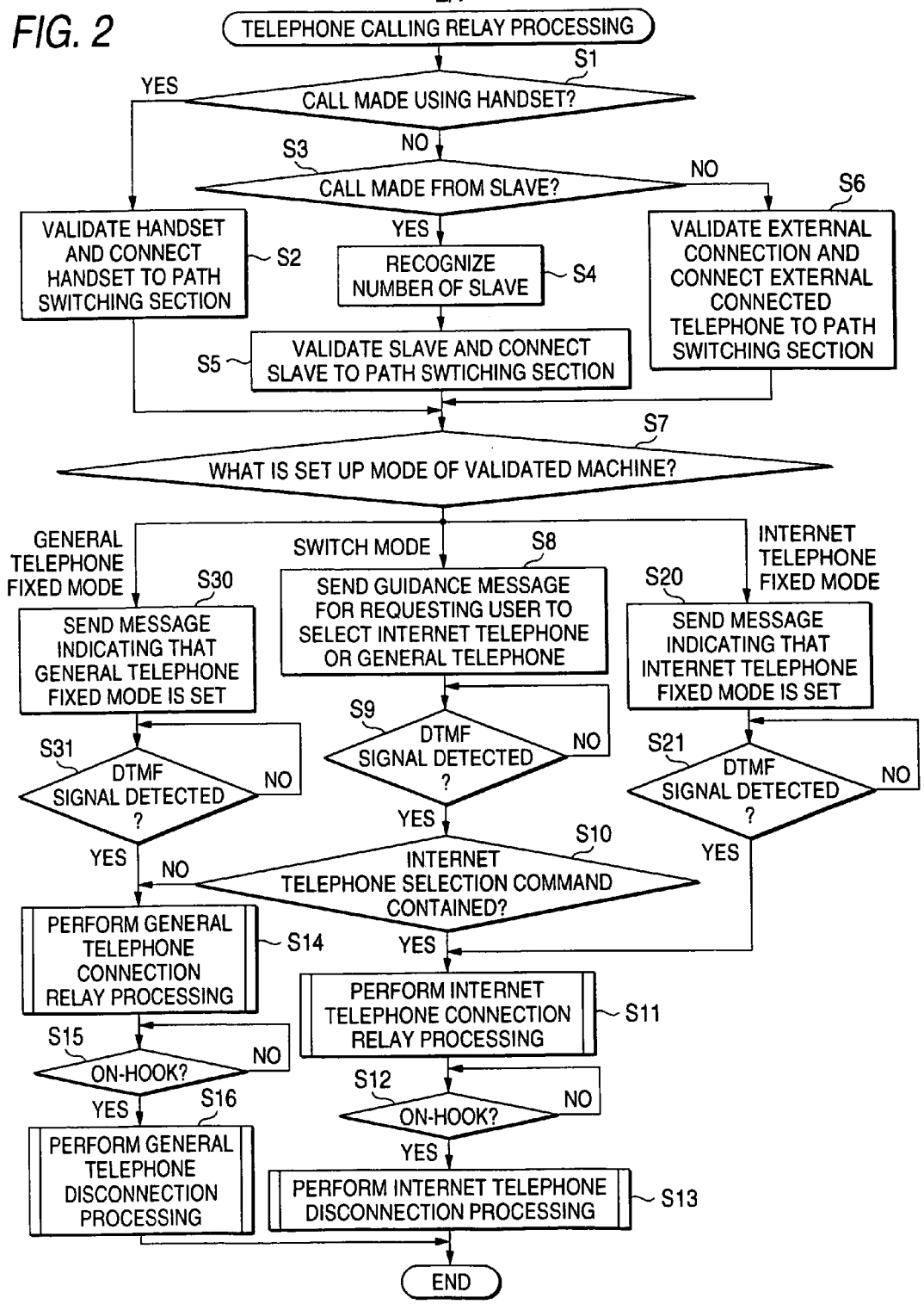
FIG. 2 is a flowchart showing a processing procedure of the IP telephone apparatus for making a call (calling)

FIG. 2 is a flowchart to show a processing procedure of the IP telephone apparatus 10 for making a call (calling). The operation keys 13a of the IP telephone apparatus 10 includes a mode setting key for the user to set a switch mode for enabling the user to selectively use either of the general telephone and Internet telephone functions or an Internet telephone fixed mode or a general telephone fixed mode for enabling the user to use only either of the general telephone and Internet telephone functions by mobile telephone (not shown) connected to the slave terminal 30 or the external machine connection terminal 16b.

To begin with, to make a call by performing the off-hook operation of the handset 14, etc., (YES at S1), the control section 11 of the IP telephone apparatus 10 validates the handset 14 and connects the handset 14 to the path switching section 19 (S2).

On the other hand, to make a call by performing the off-hook operation of the slave terminal 30, etc. (NO at S1 and YES at S3), the control section 11 recognizes the number of the slave terminal 30 (S4), validates the slave terminal 30, and connects the slave terminal 30 to the path switching section 19 (S5).

To make a call by performing the off-hook operation of the external telephone connected to the external machine connection terminal 16b, etc., (NO at S3), the control section 11 validates the external telephone and connects the external connected telephone to the path switching section 19 (S6).

A setup mode table for defining the use mode for each machine is previously stored in a register, etc., of the control section 11, as shown in FIG. 3. The control section 11 references the setup mode table and performs the following processing:

If the setup mode of the validated machine is the switch mode (switch mode at S7), the control section 11 sends a guidance message to the validated machine for requesting the user to select an Internet telephone function or a general telephone function (S8). Thus, for example, the guidance message is displayed on the display panel 34 of the slave terminal 30 or is output by voice from the loudspeaker section 36. Of course, at the same time the guidance message may be displayed or output by voice on the IP telephone apparatus 10. In this connection, the guidance message is, for example, a message telling that "only when calling an IP telephone call; dial "#" and then the telephone number." Entering "#" leads to an Internet telephone selection command.

Then, for example, the called party telephone number is entered on the slave terminal 30 and a DTMF (dual tone multifrequency) signal responsive to the entry operation is sent from the slave terminal 30 to the IP telephone apparatus 10. Upon detection of the DTMF signal from the slave terminal 30 (YES at S9), the control section 11 determines whether or not the DTMF signal contains an Internet telephone selection command (S10).

If the DTMF signal contains an Internet telephone selection command (YES at S10), the control section 11 performs Internet telephone connection relay processing (S11). According to the Internet telephone connection relay processing, the IP telephone apparatus 10 is connected through the PC 20 to the Internet 200 and the called telephone terminal on the Internet 200 is accessed. When the called telephone terminal is placed in an off-hook state accordingly, a voice packet is transferred through the Internet 200. The voice packet is processed by the communication section 23 of the PC 20 at extremely high speed and as audio signal, is transferred between the IP telephone apparatus 10 and the PC 20 through the voice. I/F 24a, the voice I/F 18a, and the audio cable 300. Further, voice is input/output between the IP telephone apparatus 10 and the radio communication section 37 of the slave terminal 30 through the voice I/F 18a, the path switching section 19, and the radio communication section 16a. Accordingly, Internet telephone conversation is conducted using the slave terminal 30. Similar operation is also performed in the external connected telephone. Of course, when an Internet telephone call is made from the IP telephone apparatus 10 as the main unit, an audio signal is transferred through the voice I/F 18a, the path switching section 19, and the handset 14 and thus to use the handset 14 of the main unit, the user can also conduct Internet telephone conversation.

For example, when Internet telephone conversation using the slave terminal 30 is terminated and if an on-hook signal is received from the slave terminal 30 (YES at S12), the control section 11 performs Internet telephone disconnection processing (S13) and terminates the telephone calling relay processing. According to the Internet telephone disconnection processing, the connection state of the voice I/F 18a, the path switching section 19, the radio communication section 16a, and the like is released and the state is returned to the former standby state.

At S12, for example; if an on-hook signal is still unsent from the slave terminal 30 in the conversation state (NO at S12), the control section 11 continues the Internet telephone conversation state until reception of an on-hook signal.

If the DTMF signal does not contain an Internet telephone: selection command (NO at S10), the control section 11 performs general telephone connection relay processing (S14). According to the general telephone connection relay processing, the IP telephone apparatus 10 is connected through the NCU 17, etc., to the telephone network 100 and the called telephone terminal on the telephone network 100 is called. When the called telephone terminal is placed in an off-hook state in response to the calling, an audio signal is transferred via the telephone network 100. The audio signal is transferred through the NCU 17, the path switching section 19, the radio communication section 16a, etc. Accordingly, general telephone conversation is conducted using the slave terminal 30. When a general telephone call is made from the external connected telephone, an audio signal is transferred through the NCU 17, the path switching section 19, and the external machine connection terminal 16b, and general telephone conversation can also be conducted with the external connected telephone. Of course, when a general telephone call is made from the IP telephone apparatus 10 as the main unit, an audio signal is transferred through the NCU 17, the path switching section 19, and the handset 14 and thus general telephone conversation can also be conducted with the main unit.

For example, if general telephone conversation using the slave terminal 30 is terminated and an on-hook signal is received from the slave terminal 30 (YES at S15); the control section 11 performs general telephone disconnection processing (S16) and terminates the telephone calling relay processing. According to the general telephone disconnection processing, the connection state of the NCU 17, the path switching section 19, the radio communication section 16a, and the like is released and the state is returned to the former standby state.

If the DTMF signal from the slave terminal 30 cannot be detected (NO at S9), the control section 11 waits for the next processing until detection of the DTMF signal. When the DTMF signal cannot be detected although a predetermined time has elapsed, the telephone calling relay processing may be terminated as time-out processing.

If the setup mode of the validated machine is the Internet telephone fixed mode (Internet telephone fixed mode at S7), the control section 11 sends a message to the effect that the Internet telephone fixed mode is set to the validated machine (S20). In this case, unlike the switch mode, it is not necessary to enter prefix "#" to the called party telephone number.

Then, if the control section 11 detects the DTMF signal from the slave terminal 30 (YES at S21), for example, as the called party telephone number is entered on the validated slave terminal 30, the control section 11 goes to S11. On the other hand, if the DTMF signal from the slave terminal 30 cannot be detected (NO at S21), the control section 11 waits for the next processing until detection of the DTMF signal. When the DTMF signal cannot be detected although a predetermined time has elapsed, the telephone calling relay processing may be terminated as time-out processing.

Further, if the setup mode of the validated machine is the general telephone fixed mode (general telephone fixed mode at S7), the control section 11 sends a message to the effect that the general telephone fixed mode is set to the validated machine (S30).

Then, if the control section 11 detects the DTMF signal from the slave terminal 30 (YES at S31), for example, as the called party telephone number is entered on the validated slave terminal 30, the control section 11 goes to S14. On the other hand, if the DTMF signal from the slave terminal 30 cannot be detected (NO at S31), the control section 11 waits for the next processing until detection of the DTMF signal. When the DTMF signal cannot be detected although a predetermined time has elapsed, the telephone calling relay processing may be terminated as time-out processing.

Figure 4:
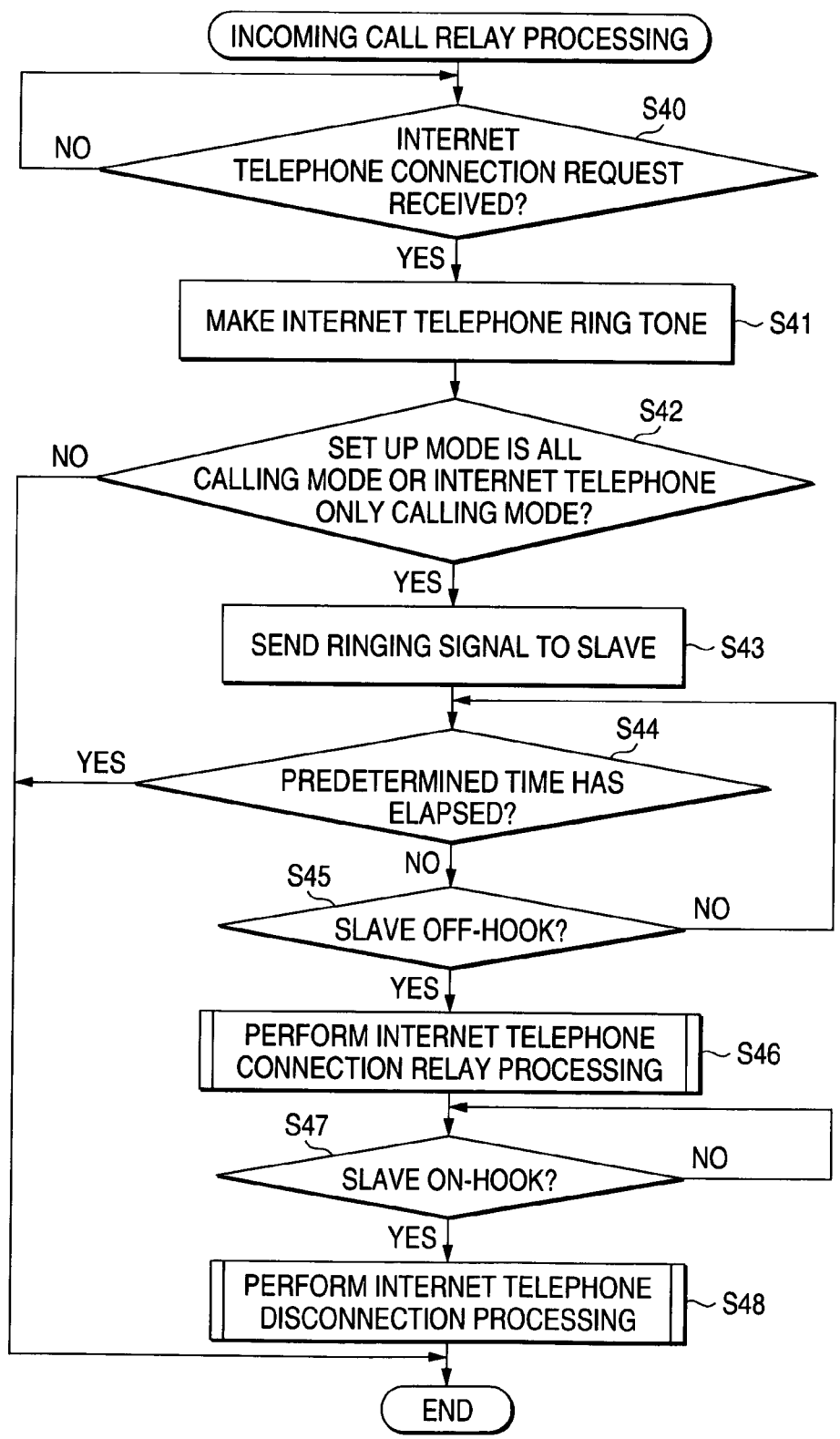
FIG. 4 is a flowchart showing a processing procedure of the IP telephone apparatus upon reception of a call (incoming call) from an Internet telephone calling party.

Next, FIG. 4 is a flowchart to show a processing procedure of the IP telephone apparatus 10 upon reception of a call (incoming call) from an Internet telephone calling party. The operation keys 13a of the IP telephone apparatus 10 includes a mode setting key for the user to set an all calling mode for sending a ringing signal to the external connected telephone and the slave terminal 30 when a connection request is received regardless of whether the telephone calling party is general telephone or Internet telephone, or an Internet telephone only calling mode or a general telephone only calling mode for sending a ringing signal to the external connected telephone and the slave terminal 30 only if a connection request is received from either of the telephone calling parties of general telephone and Internet telephone.

In this connection, FIG. 4 shows a procedure for handling calling with the slave terminal 30; however, the procedure also covers handling of calling as the user performs off-hook operation of the external connected telephone, the handset 14, etc.

To begin with, if an Internet telephone connection request is received via the PC 20 from a telephone calling party on the Internet 200 (YES at S40), the control section 11 makes a ring tone on the IP telephone apparatus 10 to inform the user that an IP telephone call is being made (S41).

At the same time, the control section 11 checks which calling mode is set in the relationship between the IP telephone apparatus 10 as the main unit and the slave terminal 30 (S42). A setup mode table to be referenced at this time is also previously stored in a register, etc., of the control section 11 although the table is not shown.

If the all calling mode or the Internet telephone only calling mode is set (YES at S42), the control section 11 sends a ringing signal to the slave terminal 30 (S43). Accordingly, a ring tone is made on the slave terminal 30 in response to reception of the ringing signal.

Then, if an off-hook signal is received from the slave terminal 30 (YES at S45) before a predetermined time has elapsed (No at S44), the control section 11 performs Internet telephone connection relay processing (S46). According to the Internet telephone connection relay processing, the slave terminal 30 is connected through the PC 20 and the IP telephone apparatus 10 to the calling telephone terminal on the Internet 200, and a voice packet is transferred through the Internet 200. The voice packet is processed by the communication section 23 of the PC 20 at extremely high speed and is transferred as audio signal between the IP telephone apparatus 10 and the PC 20 through the voice I/F 24a, the voice I/F 18a, and the audio cable 300. Further, voice is input/output between the IP telephone apparatus 10 and the radio communication section 37 of the slave terminal 30 through the voice I/F 18a, the path switching section 19, and the radio communication section 16a. Accordingly, the Internet telephone call can be received using the slave terminal 30. Similar operation is also performed in the external connected telephone. Of course, if the user performs the off-hook operation of the handset 14 of the IP telephone apparatus 10 as the main unit, an audio signal is transferred through the voice I/F 18a, the path switching section 19, and the handset 14 and thus to use the handset 14 of the main unit, the user can also conduct Internet telephone conversation.

If Internet telephone conversation is terminated through the slave terminal 30 and an on-hook signal is received from the slave terminal 30 (YES at S47), the control section 11 performs Internet telephone disconnection processing (S48) and terminates the incoming call relay processing. According to the Internet telephone disconnection processing, the connection state of the voice I/F 18a, the path switching section 19, the radio communication section 16a, and the like is released and the state is returned to the former standby state.

At S47, if an on-hook signal is still unsent from the slave terminal 30 (NO at S47), the control section 11 continues the Internet telephone conversation state until reception of an on-hook signal.

If an off-hook signal is not received from the slave terminal 30 (NO at S45), the control section 11 returns to S44.

If a predetermined time has elapsed without receiving an off-hook signal from the slave terminal 30 (YES at S44), the incoming call relay processing is terminated as time-out processing.

If the general telephone only calling mode is set (NO at S42), the control section 11 does not send a ringing signal to the slave terminal 30 and terminates the incoming call relay processing if an Internet telephone connection request is received. That is, in this case, no ring tone is made on the slave terminal 30.

If an Internet telephone connection request is not received (NO at S40), the control section 11 continues the standby state until reception of an Internet telephone connection request. If a general telephone connection request is received, a processing procedure responsive to the connection request is executed.

Therefore, according to the embodiment, the user can not only conduct Internet telephone conversation using the handset 14 of the IF telephone apparatus 10, but also make an Internet telephone call and conduct conversation using the slave terminal 30 including only the general telephone function.

To make an Internet or general telephone call using the slave terminal 30, when the slave terminal 30 is set to the switch mode on the IP telephone apparatus 10, a guidance message for requesting the user to select either of the Internet telephone and general telephone functions is sent to the slave terminal 30 or the external connected telephone. Thus, the user can easily make an Internet or general telephone call simply by operating the slave terminal 30 according to the guidance message.

An Internet telephone incoming call can be handled not only using the IP telephone apparatus 10 but also using the slave terminal 30.

If a connection request is received from an Internet telephone calling party, a ringing signal is sent to the slave terminal 30, so that a ring tone is also made on the slave terminal 30, enabling the user to reliably know reception of an Internet telephone call.

The invention is not limited to the above-described embodiment.

In the embodiment, the IP telephone system 1 includes the IP telephone apparatus 10 and the PC 20 connected by the audio cable 300 by way of example. However, if the IP telephone apparatus 10 has a configuration functioning in a similar manner to that of the PC 20, only the IP telephone apparatus 10 may implement the IP telephone system 1. Specifically, like an IP telephone system 2 shown in FIG. 5, the IP telephone apparatus 10 may additionally include a communication section 42 for connecting the IP telephone apparatus 10 to the Internet 200 and an Internet conversation processing section 44 in which conversation software is built for causing the control section 11 to function like the control section 21 of the PC 20 operating in accordance with the conversation software.

FIG. 6 shows an IP telephone system according to another embodiment of the invention. The IP telephone system 50 shown in FIG. 6 includes the IP telephone apparatus 10 and the computer 20, both configured the same as the IP telephone apparatus 10 and the computer 20 in the above embodiment. The IP telephone system 50 further includes an external telephone 60 connected to the external machine connection terminal 16b of the IP telephone apparatus 10.

FIG. 7 is a block diagram showing the configuration of the external telephone 60. The external telephone 60 is configured to exclusively execute a telephone call via a telephone network, and includes a control section 111 for controlling the whole operation of the apparatus, a record and playback section 112 for playing back a voice based on an audio signal and recording an audio signal, a user interface section (user I/F) 113, a handset 114 used in a state in which the handset 114 is removed from the external telephone 60 main unit, a voice input/output section 115 for inputting/outputting a voice, an NCU (network control unit) 117 for inputting/outputting an audio signal, for example, via the external machine connection terminal 16b, and the like.

The record and playback section 112 includes a message playback section 112a for playing back voice (sound) based on various audio signals previously recorded and a message record section 112b for recording a message recorded in an automatic answering mode as an audio signal. Recorded in the message playback section 112a are audio signals such as a ring tone used upon reception of an incoming call, a holding tone used when voice conversation is held and a telephone answering mode message telling that recording a message is started by an automatic answering mode function.

The user I/F 113 includes a plurality of operation keys 113a consisting of keys and a display panel 113b for displaying various pieces of information. The operation keys 113a includes a plurality of numeric keys, a hold key for starting and terminating holding of voice conversation, an outside line key for starting voice conversation, an off key for terminating voice conversation, and the like.

The NCU 117 is connected to the external machine connection terminal 16b of the IP telephone apparatus 10.

In the IP telephone system 50 shown in FIGS. 6 and 7, the procedures of calling and an incoming call can be performed are the same as the procedures shown in the flowchart of FIGS. 2 and 4.

According to the embodiment, the user can not only conduct Internet telephone conversation using the handset 14 of the IP telephone apparatus 10, but also make an Internet telephone call and conduct conversation using the external telephone 60 including only the general telephone function.

To make an Internet or general telephone call using the external telephone 60, when the external telephone 60 is set to the switch mode on the IP telephone apparatus 10, a guidance message for requesting the user to select either of the Internet telephone and general telephone functions is sent to the external telephone 60. Thus, the user can easily make an Internet or general telephone call simply by operating the external telephone 60 according to the guidance message.

Further, in the IP telephone system 50, an Internet telephone incoming call can be handled not only using the IP telephone apparatus 10, but also using the external connected telephone 60.

Incidentally, the external telephone 60 may be connected to the IP telephone apparatus 10 via the radio communication section 16a by means of radio communications.

Incidentally, in the above embodiment, an automatic answering function may be contained only in the external telephone 60 and not contained in the IP telephone apparatus 10. In this case, the external telephone 60 can automatically respond to an Internet telephone incoming call and can record voice from the Internet telephone calling party. That is, simply by connecting to the IP telephone apparatus 10 an already existing external telephone having only the general telephone function such as the external telephone 60, the. Internet telephone function can be used and moreover effective use of various functions of the already existing external connected telephone can be made in Internet telephone.

Incidentally, in the above embodiments, it is necessary to prefix "#" to the called party telephone number in entering the telephone number when making an Internet telephone call; however, it may also be made necessary to enter a specific key when making a general telephone call.

As described above, according to the invention, the user can conduct Internet telephone conversation using the IP telephone apparatus alone and in addition, for example, if an external telephone such as a cordless telephone or an external installed telephone having only the general telephone function is connected, the user can conduct Internet telephone conversation using the external telephone.

According to the invention, the user can conduct Internet telephone conversation via the computer connected to the Internet.

According to the invention, the user can conduct Internet telephone conversation using a cordless telephone such as a slave.

According to the invention, the user can conduct Internet telephone conversation using a mobile telephone connected to the external machine connection terminal by a cable or the like.

According to the invention, the Internet telephone conversation start can be detected in response to the presence or absence of an Internet telephone command.

According to the invention, the user can conduct Internet telephone conversation using the handset of the apparatus main unit or the handset of the external telephone, which is off-hook: at present.

According to the invention, when making an Internet or general telephone call using the external telephone, a guidance message for requesting the user to select either of the Internet telephone and general telephone functions is sent to the external telephone. Thus, the user can easily make an Internet or general telephone call simply by operating the external telephone according to the guidance message.

According to the invention, when making an Internet or general telephone call using the external telephone, a message responsive to the switch mode or the fixed mode set at the point in time is sent to the external telephone. Thus, the user can easily make an Internet or general telephone call simply by operating the external telephone according to the message.

According to the invention, the Internet telephone function is provided through the computer.

According to the invention, when a connection request is received from an Internet telephone calling party, the external telephone can also handle the connection request.

According to the invention, when a connection request is received from an Internet telephone calling party, a ringing signal is sent to the external telephone, so that a ring tone is also made on the external telephone, enabling the user to reliably know reception of an Internet telephone call.

According to the invention, in the one calling mode for sending a ringing signal to the external telephone only when a connection request is received from a calling party on the Internet, a ring tone is made on the external telephone only when an Internet telephone call is received, enabling the user to reliably know reception of the Internet telephone call.

What is claimed is:

1. An IP telephone apparatus for executing a telephone call through a computer network, comprising:
    a main unit having a handset;
    a telephone line connection unit that connects to a telephone network;
    an external telephone connection unit being connectable to an external telephone having a handset;
    a dialing start command detection unit configured to detect an IP telephone dialing start command;
    an audio signal input/output unit that inputs/outputs an audio signal for conversation when the dialing start command unit detects the IP telephone dialing start command;
    a handset validation unit configured to selectively validate one of the handset of the main unit and the handset of the external telephone;
    an audio signal path switching unit that switches a connection target of the handset validated by the handset validation unit from the telephone line connection unit to the audio signal input/output unit when the dialing start command detection unit detects the IP telephone dialing start command;
    a network communication control unit, further comprising a network terminal that connects to the computer network, the network communications control unit configured to enable the audio signal input/output unit to transmit and receive the audio signal to and from the network terminal when the dialing start command detection unit detects the IP telephone dialing start command;
    a message transmission unit that sends to the external telephone a guidance message to selectively use one of a general telephone function for telecommunicating by use of the telephone network and an IP telephone function for telecommunicating by use of the computer network, upon reception of an off-hook signal from the external telephone; and
    a mode setting unit that sets one of a switch mode and a fixed mode, the switch mode for allowing a user to selectively switch between the general telephone function and the IP telephone function, the fixed mode for allowing the user to use either of the general telephone function and the IP telephone function exclusively.

2. The IP telephone apparatus as claimed in claim 1, further comprising:
    a control signal input/output unit being connected to a computer to input/output control signals containing a command for executing an IP telephone dialing;
    wherein upon detection of the IP telephone dialing start command, the IP communication control unit makes the control signal input/output unit output a control signal containing the command to the computer.

3. The IP telephone apparatus as claimed in claim 1, wherein the external telephone connection unit comprises a radio communication section for communicating with the external telephone by radio.

4. The IP telephone apparatus as claimed in claim 1, wherein the external telephone connection unit comprises an external machine connection terminal for connecting to the external telephone.

5. The IP telephone apparatus as claimed in claim 1, wherein the dialing start command detection unit detects the IP telephone dialing start command based on the presence or absence of an IP dialing command generated within one of the IP telephone apparatus and the external telephone based on operation of a user.

6. The IP telephone apparatus as claimed in claim 5, wherein the IP telephone command is generated by operating a general telephone function within one of the IP telephone apparatus and the external telephone, the general telephone function for telecommunicating by use of the telephone network.

7. The IP telephone apparatus as claimed in claim 6, wherein the IP telephone command is input with a predetermined button of one of the IP telephone apparatus and the external telephone.

8. The IP telephone apparatus as claimed in claim 1, wherein the handset validation unit detects an off-hook signal generated from one of the handset of the main unit and the handset of the external telephone and validates the handset corresponding to the detected off-hook signal.

9. The IP telephone apparatus as claimed in claim 1, further comprising: a message notifying unit configured to notify a message to a user; and
the message transmission unit controls the message notifying unit to notify the guidance message to the user.

10. The IP telephone apparatus as claimed in claim 9, wherein the message notifying unit includes at least one of a display configured to display the message and a loudspeaker configured to output the message.

11. The IP telephone apparatus as claimed in claim 1, wherein the external telephone comprises a cordless slave terminal of the IP telephone apparatus.

12. The IP telephone apparatus as claimed in claim 1, further comprising:
a cordless slave terminal capable of being used as the external telephone.

13. An IP telephone system, comprising:
a computer connected to a network terminal via a computer network;
a handset that receives and generates an audio signal for a telephone conversation;
a telephone line connection unit connectable to a telephone network;
a computer connection unit connectable to the computer;
an audio signal path switching unit that switches a path of the audio signal to one of the telephone line connection unit and the computer connection unit;
an external telephone connection unit connected to an external telephone having a general telephone function for telecommunicating through a telephone network;
an IP telephone relay unit configured to receive a predetermined command from the external telephone through the external telephone connection unit and to make the audio signal path switching unit switch the path to the computer connection unit upon reception of a predetermined command, so that the external telephone can telecommunicate with the network terminal; and
a mode setting unit configured to set an all calling mode for sending a ringing signal to the external telephone in response to a connection request received from each of a calling party on the telephone network and the network terminal, and to set one calling mode for sending a ringing signal to the external telephone only when a connection request is received from one of a calling party on the telephone network and the network terminal.

14. The IP telephone system as claimed in claim 13, wherein the computer outputs a signal for validating the IP telephone relay unit upon reception of a connection request from the network terminal.

15. The IP telephone system as claimed in claim 13, further comprising a ringing signal output unit configured to output a ringing signal to the external telephone upon reception of a connection request from the network terminal.

16. The IP telephone system as claimed in claim 13, wherein the predetermined command is input with a predetermined button of the external telephone.

17. An IP telephone apparatus for executing a telephone call through a computer network, comprising:
a main unit having a handset;
a telephone line connection unit that connects to a telephone network;
an external telephone connection unit being connectable to an external telephone for executing a telephone call through a telephone network, the external telephone having a handset;
a dialing start command detection unit configured to detect an IP telephone dialing start command;
an audio signal input/output unit that inputs/outputs an audio signal for conversation when the dialing start command unit detects an IP telephone dialing start command;
a handset validation unit configured to selectively validates one of the handset of the main unit and the handset of the external telephone;
an audio signal path switching unit that switches a connection target of the handset validated by the handset validation unit from the telephone line connection unit to the audio signal input/output unit when the dialing start command detection unit detects the IP telephone dialing start command;
a network communication control unit configured to enable the audio signal input/output unit to transmit and receive the audio signal to and from the network terminal when the dialing start command detection unit detects the IP telephone dialing start command;
a message transmission unit that sends to the external telephone a guidance message to selectively use one of a general telephone function for telecommunicating by use of the telephone network and an IP telephone function for telecommunicating by use of the computer network, upon reception of an off-hook signal from the external telephone; and
a mode setting unit configured to set a switch mode or a fixed mode, the switch mode for allowing a user to selectively switch between the general telephone function and the IP telephone function, the fixed mode for allowing the user to use one of the general telephone function and the IP telephone function exclusively;
wherein the message transmission unit sends the guidance message to the external telephone upon reception of an off-hook signal from the external telephone in the switch mode; and
the message transmission unit sends a message to the effect that the fixed mode is set to the external telephone upon reception of an off-hook signal from the external telephone in the fixed mode.

18. The IP telephone apparatus as claimed in claim 17, further comprising:
a control signal input/output unit being connected to a computer to input/output control signals containing an IP telephone dialing start command;
wherein upon detection of the IP telephone dialing start command, the IP communication control unit makes the control signal input/output unit output a control signal for executing an IP telephone dialing to the computer.

19. The IP telephone apparatus as claimed in claim 17, wherein the external telephone connection unit comprises a radio communication section for communicating with the external telephone by radio.

20. The IP telephone apparatus as claimed in claim 17, wherein the external telephone connection unit comprises an external machine connection terminal for connecting to the external telephone.

21. The IP telephone apparatus as claimed in claim 17, wherein the dialing start command detection unit detects the IP telephone dialing start command based on the presence or absence of an IP dialing command generated within one the IP telephone apparatus and the external telephone based on operation of a user.

22. The IP telephone apparatus as claimed in claim 21, wherein the IP telephone command is generated by operating a general telephone function within one of the IP telephone apparatus and the external telephone, the general telephone function for telecommunicating by use of the telephone network.

23. The IP telephone apparatus as claimed in claim 22, wherein the IP telephone command is input with a predetermined button of one of the IP telephone apparatus and the external telephone.

24. The IP telephone apparatus as claimed in claim 17, wherein the handset validation unit detects an off-hook signal being generated from one of the handset of the main unit and the handset of the external telephone and validates the handset corresponding to the detected off-hook signal.

25. The IP telephone apparatus as claimed in claim 17, further comprising: a message notifying unit configured to notify a message to a user; and
the message transmission unit controls the message notifying unit to notify the guidance message to the user.

26. The IP telephone apparatus as claimed in claim 25, wherein the message notifying unit includes at least one of a display configured to display the message and a loudspeaker configured to output the message.

27. An IP telephone apparatus, comprising:
a main unit having a handset;
an external telephone connection unit being connectable to an external telephone having a handset;
a telephone line connection unit being connectable to a telephone network;
a network connection unit being connectable to a computer network;
an IP command generating unit configured to generate an IP telephone command for executing an IP telephone call;
a handset validation unit configured to selectively validate one of the handset of the main unit and the handset of the external telephone;
an audio signal path switching unit that switches a connection target of the handset validated by the handset validation unit from the telephone line connection unit to the network connection unit upon detection of the IP telephone command; and
a mode setting unit configured to set an all calling mode for sending a ringing signal to the external telephone in response to a connection request received from each of a calling party on the telephone network and a network terminal on the computer network, and to set one calling mode for sending a ringing signal to the external telephone only when a connection request is received from one of a calling party on the telephone network and the network terminal.

* * * * *